United States Patent
Yip et al.

(10) Patent No.: US 7,245,629 B1
(45) Date of Patent: Jul. 17, 2007

(54) METHOD AND APPARATUS FOR A CONTROL COMMUNICATION CHANNEL IN A PACKET-FORWARDING DEVICE

(75) Inventors: Michael Yip, Sunnyvale, CA (US);
Steve W. Schroder, Portland, OR (US);
Minxi Gao, San Jose, CA (US)

(73) Assignee: Extreme Networks, Santa Clara, CA (US)

( * ) Notice: Subject to any disclaimer, the term of this patent is extended or adjusted under 35 U.S.C. 154(b) by 980 days.

(21) Appl. No.: 10/277,548

(22) Filed: Oct. 21, 2002

Related U.S. Application Data

(63) Continuation of application No. 10/153,842, filed on May 21, 2002, now abandoned.

(51) Int. Cl.
*H04L 12/40* (2006.01)

(52) U.S. Cl. .................. 370/438; 370/419; 370/463; 710/305

(58) Field of Classification Search .............. 370/386, 370/389, 539, 402, 419, 359, 438, 463; 710/100, 710/305; 718/103
See application file for complete search history.

(56) References Cited

U.S. PATENT DOCUMENTS

| | | | | |
|---|---|---|---|---|
| 5,193,189 | A * | 3/1993 | Flood et al. | 718/103 |
| 6,597,693 | B1 * | 7/2003 | Leung | 370/386 |
| 2006/0114897 | A1 * | 6/2006 | Suri | 370/389 |

* cited by examiner

*Primary Examiner*—John Pezzlo
(74) *Attorney, Agent, or Firm*—Blakely Sokoloff Taylor & Zafman

(57) ABSTRACT

A control backplane replaces the traditional shared bus with a dedicated communication channel using a high-speed protocol, such as Ethernet. The resulting system may conduct several concurrent control sessions with clients and devices associated with the network switch. Removing the shared bus from the control plane also improves the reliability of the new system, because it is no longer susceptible to a single point of failure.

16 Claims, 6 Drawing Sheets

METHOD AND APPARATUS FOR A CONTROL COMMUNICATION CHANNEL IN A PACKET-FORWARDING DEVICE

The present patent application is a Continuation of application Ser. No. 10/153,842, filed May 21, 2002.

TECHNICAL FIELD

The present invention relates to the architecture and operation of network devices. More particularly, the present invention relates to improving delivery of control functions in a packet-forwarding device, such as a switch or router.

BACKGROUND AND RELATED ART

In general, packet-forwarding device functions may be characterized into at least two types, data path functions and control functions. Data path functions include operations that are performed on every datagram that passes through the packet-forwarding device, such as a router, where a datagram is an independent, self-contained message sent over the network whose arrival, delivery time, and content are not guaranteed. During the typical path of a packet through an IP router or network switch, the data path functions include the forwarding decision, the backplane, and output communication channel scheduling.

In contrast, control functions typically include operations that are performed infrequently relative to the data path functions. As a result many control functions are implemented in software and firmware. Exemplary control functions include the exchange of routing table information internally and with neighboring routers, as well as delivering quality of service information, or other system configuration and management information. The occasional control function received from an external device, such as a remote terminal or server, adds to the coordination complexity, as control functions received on the data plane must be converted for transmission across the control plane.

Because of the irregular nature of many control functions, there is a tremendous difference in the time constraints associated with various control functions. In fact, the speed requirements of many control functions vary by several orders of magnitude. For example, the exchange of updated routing table information within the packet-forwarding device may occur at Megahertz (MHz) and Gigahertz (GHz) frequencies while monitoring the operational parameters of the fans within the packet-forwarding device need only occur at Kilohertz (kHz) intervals. These irregularities create overhead that drains valuable resources from the processor unit.

Presently, most routers use shared buses or shared-memory backplanes for data path and control functions. Unfortunately, these shared buses, which share the communication channel between multiple functions, easily become congested under modern switching demands, especially if the bus bandwidth doesn't match the aggregate data rate of the ports and processor unit Input/Output (I/O), thus limiting the performance of the system. In the past, the computer industry has simply developed a faster shared bus as the need arose, thus the shared bus has evolved from Industry Standard Architecture (ISA) to Extended Industry Standard Architecture (EISA) to the modern Peripheral Component Interconnect (PCI).

Unfortunately, continuing this pattern of development with regards to shared backplanes is impractical for several reasons. One reason is that a shared bus reduces the overall reliability of the packet-forwarding device. As control functions must pass across the shared bus, it becomes a single point of failure that potentially shuts down the entire packet-forwarding device. Even worse, a failed shared bus may introduce erratic undetectable errors, which alter the data being transmitted through the packet-forwarding device causing the data to be corrupted.

Another reason is low scalability of shared bus architectures. The scalability or transfer-capacity of a shared bus is limited by several factors including electrical loading, the number of connectors that a signal encounters, and the reflections from the end of unterminated lines. In addition, scalability of the shared bus is often limited by congestion on the shared bus. Specifically, the bandwidth of the bus is shared among all the attached devices so that any contention between attached devices leads to additional delay for control information being sent across the shared control bus. If the rate of control information exceeds the bus bandwidth for a sustained period, buffers risk overflow-errors and loss of data.

SUMMARY

A method is provided for a control backplane system in which a separate control backplane is used as a communication channel for transmitting control information in a packet-forwarding device. Exemplary control information includes management, configuration, security, accounting, debugging, external network management, and background routing processes. Among other advantages, the use of a control backplane to deliver the control information improves scalability by reducing the congestion and improves reliability by making the packet-forwarding device less susceptible to a single point of failure.

According to one aspect of the invention, the control backplane system categorizes control information into data path control information and device management control information. One dedicated control backplane system may even separate the delivery of data path control information from that of device management control information, including delivering the device management control information over a lower frequency communication channel or over a secondary control backplane altogether.

According to one aspect of the invention, the control backplane system advantageously improves performance of the packet-forwarding device by using a high-speed protocol to deliver the control information. The control backplane system packetizes the control information into control packets in accordance with the high-speed protocol and further supports concurrent control sessions in the communication channel in which the control packets are transmitted simultaneously between components within the packet-forwarding device, as well as between clients or other devices associated with the packet-forwarding device. According to one aspect of the invention, the control backplane system generates the control packets from external control packets originating from external network devices connected to the packet-forwarding device.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above and other methods.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1:
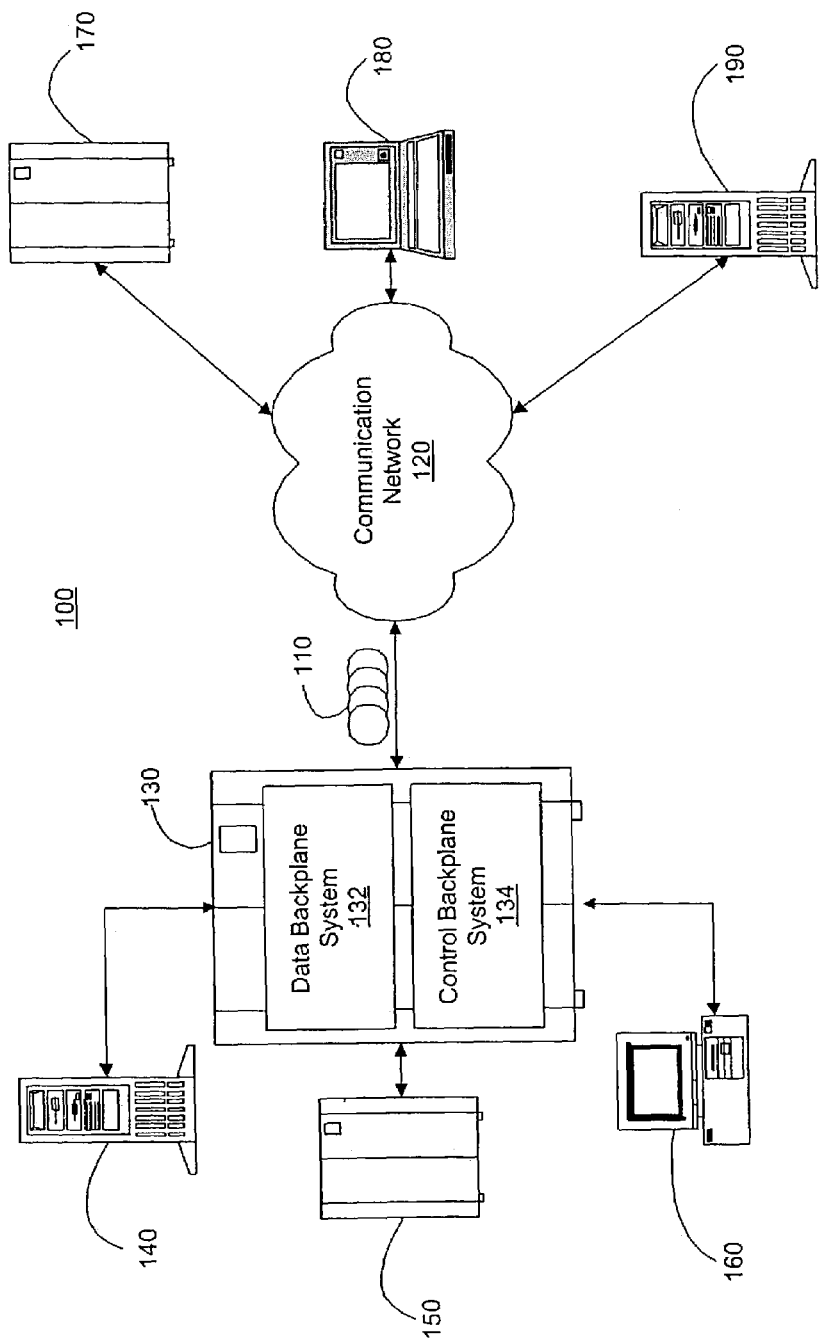
FIG. 1 illustrates a suitable network environment according to one embodiment of the invention.

In the following description various aspects of the present invention, a method and apparatus for using Ethernet as a control communication channel in a packet-forwarding device will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. Reference in the specification to "one aspect of the invention" or "one embodiment" or "an embodiment" means that a particular feature, aspect, structure, or characteristic described in connection with the embodiment is included in at least one embodiment of the invention. The appearances of the phrase "in one embodiment" in various places in the specification do not necessarily all refer to the same embodiment, although it may.

A packet-forwarding device is generally a network device that forwards traffic between networks. Exemplary packet-forwarding devices include network switches, routers, bridges, hubs, servers, personal computers, and other similar devices that are accessible by or over a network. The forwarding decision is generally based on network layer information and routing tables, often constructed by routing protocols. Routing is the process of selecting the correct interface and next hop for a packet being forwarded.

Control backplane, as that term is used herein, refers to the combination of hardware and software components associated with delivering control information to perform control functions within the packet-forwarding device. A dedicated control backplane refers to a backplane with separate physical communication channels connecting each attached device. A shared control backplane allow devices to communicate over the same physical communication channel. As such the bandwidth of a dedicated control backplane is fixed for each device, while the shared control backplane assigns a bandwidth to each active communication channel.

Control information, as that term is used herein, includes data path control information and device management control information. The data path control information is data that affects the routing of data packets in the device, including updated route table data, quality of service data, or other control data exchanged between route processors, I/O cards, crossbar and Ethernet switch components. The device management control information is any data that affects the physical operation of the packet-forwarding device, including Input/Output card management, chassis temperature, fan speed, and power supply status. Categorizing control information into data path control information and device management control information is only one exemplary way to categorize control functions, one of skill in the art would recognize that other equally acceptable methods are available for separating control information that should be considered within the scope of embodiments of the present invention. For example, the control information could also be categorized as high-frequency control information and low-frequency control information.

FIG. 1 and the following discussion are intended to provide a brief, general description of a suitable networking architecture and environment 100 in which the invention may be implemented. The illustrated network architecture 100 contemplated in the illustrated embodiment of the invention provides a scalable, low cost solution to distribute data 110 across a communication network 120 via network switch 130, thereby delivering data 110 from source network devices 140–160 to destination network devices 170–190. The network switch 130 includes a data backplane system 132 for routing data 110 and a control backplane system 134 for delivering control information.

While most of the data 110 passing through network switch 130 via the data backplane system 132 are data packets, occasionally, the data 110 is intended for the control backplane system 134, such as control packets from a remote terminal 160. These control packets may request control information, such as loading or congestion statistics, or provide the network switch 130 with additional operational instructions. Control information typically comprises data path control information and device management control information. According to one aspect of the invention, the data path control information is any data which affects the routing of data packets in the device, including updated route table data, quality of service data, or other control data exchanged between route processors, I/O cards, crossbar and Ethernet switch components. The device management control information is any data that affects the physical operation of the device, including Input/Output card management, chassis temperature, fan speed, and power supply status.

The network switch 130 is coupled to communication network 120, either directly or via an internetwork. Multiple source and destination clients, such as client destinations 170–190, are likewise coupled in communication, either directly or via an internetwork, with switch 130. While only three destinations are depicted in FIG. 1, in a typical environment the number of destinations far surpasses the number of servers. For example, the number of destinations is often one or more orders of magnitude greater than the number of servers.

Moreover, those skilled in the art will appreciate that source network devices 140–160 and destination network devices 170–190 may be practiced with other network device configurations. Additionally, the invention may be practiced with other source and destination network devices, including network switches, routers, servers, hubs, multiprocessor systems, programmable or configurable consumer electronics, network PCs, minicomputers, mainframe computers, personal computer systems and the like. Embodiments of the invention may also be practiced using different forms of data, including but not limited to data packets and streaming media.

Figure 2:
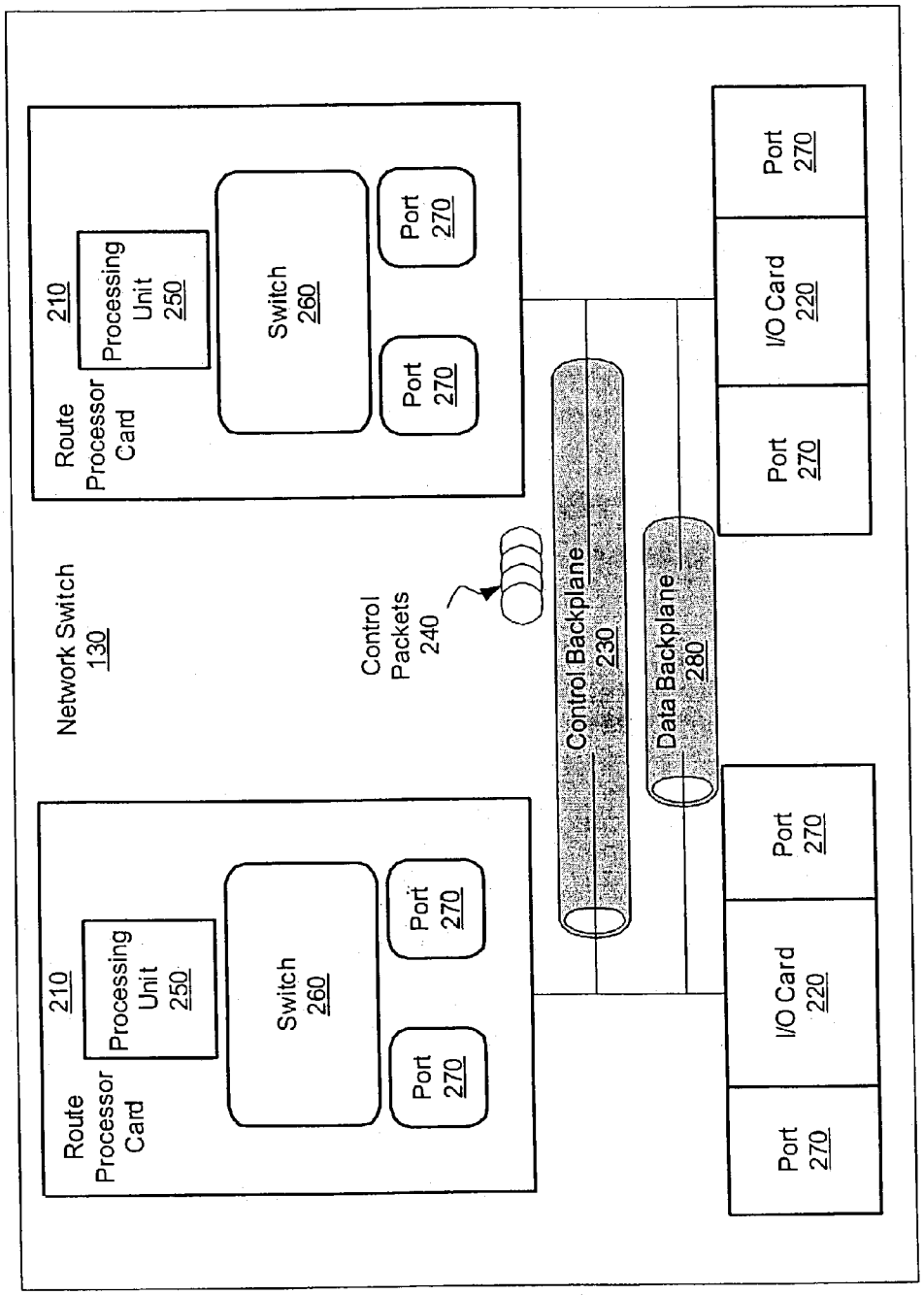
FIG. 2 is a block diagram of dual route processor backplane architecture according to one embodiment of the invention.

FIG. 2 illustrates one embodiment of a network switch 130 having a control backplane 230 and a data backplane 280. The network switch 130 includes dual route processor cards 210 coupled with the control backplane 230 to deliver control packets 240 within the network switch 130. The network switch 130 also includes a plurality of Input/Output (I/O) cards 220 selectively coupled with the control backplane 230. Each route processor card 210 includes a Processing Unit (CPU) 250, a switch 260, and at least two I/O ports 270. As discussed previously, the CPU 250 is responsible for a majority of the control functions within the route processor 210. Specifically, the CPU 250 maintains the master forwarding tables used in the I/O cards 220 and handles system management functions. While FIG. 2 only illustrates two route processor cards 210, several other network switch configurations are acceptable and within the scope of at least one embodiment of the invention, for example an embodiment using a single route processor and an embodiment that employs four or more route processors would also benefit from employing the control backplane architecture.

The switch 260 provides interface ports to couple the route processor card 210 with the neighboring I/O cards 220 and the other route processor card 210. In one embodiment the network switch 130 uses Ethernet as the communication protocol for the control backplane 230. An exemplary Ethernet switch is the Broadcom® BCM5615 integrated multi-layer switch which provides twenty-four 10/100 Mb Ethernet ports and two 10/100/1000 Mb Ethernet ports.

The control backplane 230 provides a control communication channel between devices integrated within the network switch 130, such as route processor cards 210, I/O cards 220, and crossbar switches. By separating the control functions onto a separate backplane from the data functions, the predictability of the data plane is improved. Furthermore, the information sent across the control backplane 230 may be packetized, enabling concurrent communication on a dedicated backplane between the attached devices. In one embodiment, the control backplane transfers Ethernet control packets 240 between the route processors 210 and/or the I/O cards 220. This enables the Ethernet switch 260 to receive and convert external control packets, such as commands from a remote terminal or neighboring network switch, for use on the control backplane without substantial conversion costs. In addition to Ethernet, various other communication protocols may also be adopted by the control backplane, such as InfiniBand, HyperTransport, High-speed serial (USB or FireWire 1394), and the like.

In one embodiment, the control backplane 230 is preferably a dedicated backplane. A dedicated backplane allows the route processor cards 210 to concurrently send information to the attached devices. For example, the primary route processor could concurrently send an updated routing table to all of the I/O cards and at the same time the secondary route processor could send different control packets.

Figure 3:
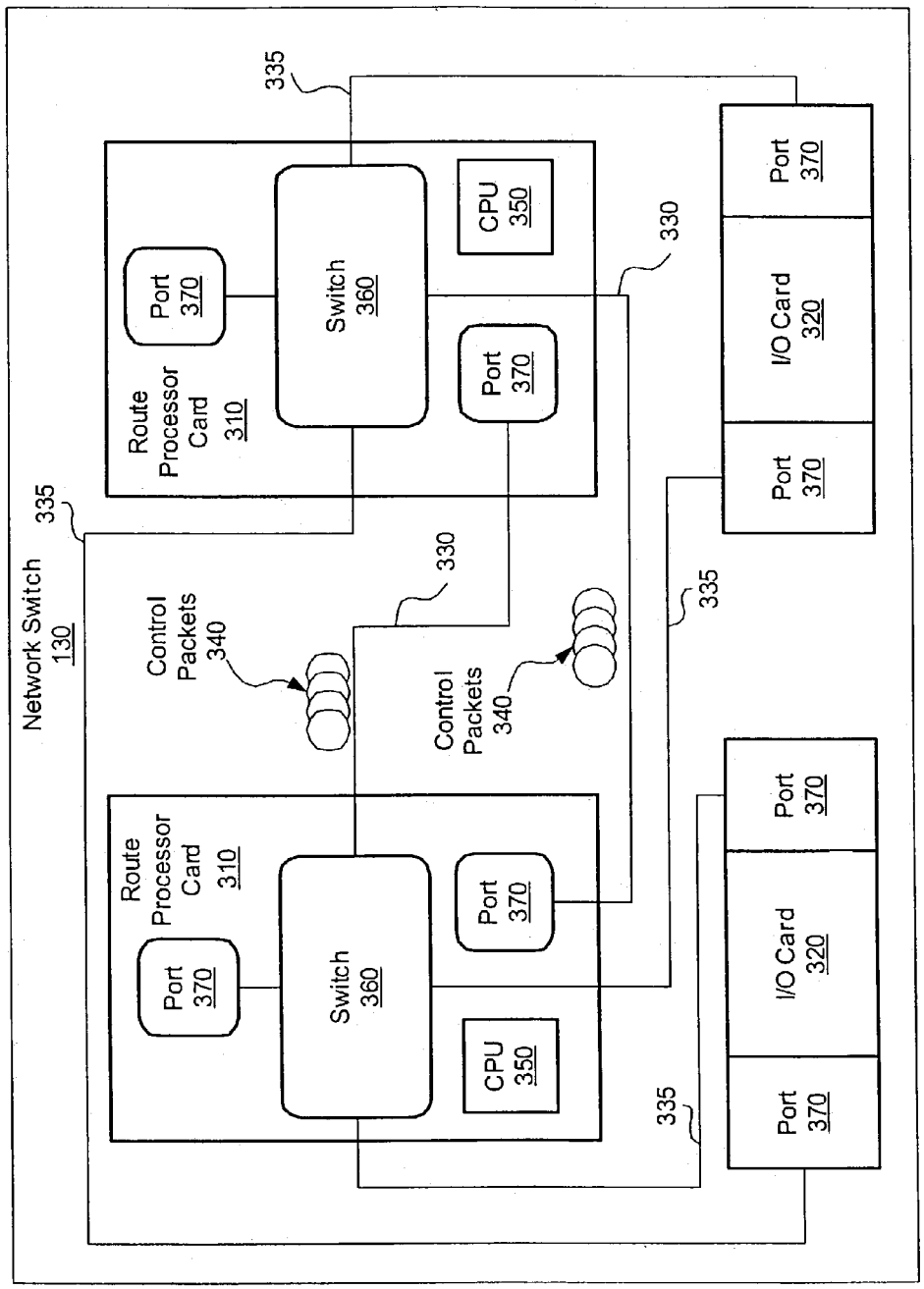
FIG. 3 is a block diagram of dedicated backplane architecture according to one embodiment of the invention.

FIG. 3 illustrates one embodiment of a network switch 130 using dedicated control backplanes, such as Ethernet communication channels 330 and 335. Specifically, the route processor cards 310 exchange Ethernet packets 340 with the other route processor card 310 via Ethernet ports 370 that are coupled to the Gigabit Ethernet communication channels 330 and with the I/O cards 320 via Ethernet ports 370 that are coupled to the Ethernet communication channels 335. As in FIG. 2, switch 360 also provides Gigabit Ethernet interconnectivity with the route processor CPUs 350. The dedicated connections eliminate the single point of failure condition associated with shared bus configurations. In one embodiment, the dedicated Ethernet embodiment illustrated in FIG. 3 is fully recoverable from a single point of failure. For example, when one of the lines to a route processor is damaged, the control information may be rerouted via either one of the I/O cards 320. Another advantage of the dedicated line is that routing tables may be sent concurrently to all the attached network devices. Dedicated Ethernet also provides more bandwidth than comparable shared bus embodiments. Furthermore, the route processors 310 of the network switch 130 no longer need to share the same chassis. An Ethernet control network allows for the physical locations of the route processors to be further apart. For example, clients that are operationally in the same department, but are physically located in different buildings or cities, may create coordinated networks in the same collision zone. This same topology also allows users to be excluded from various collision zones, even though their computers are in close proximity.

Figure 4:
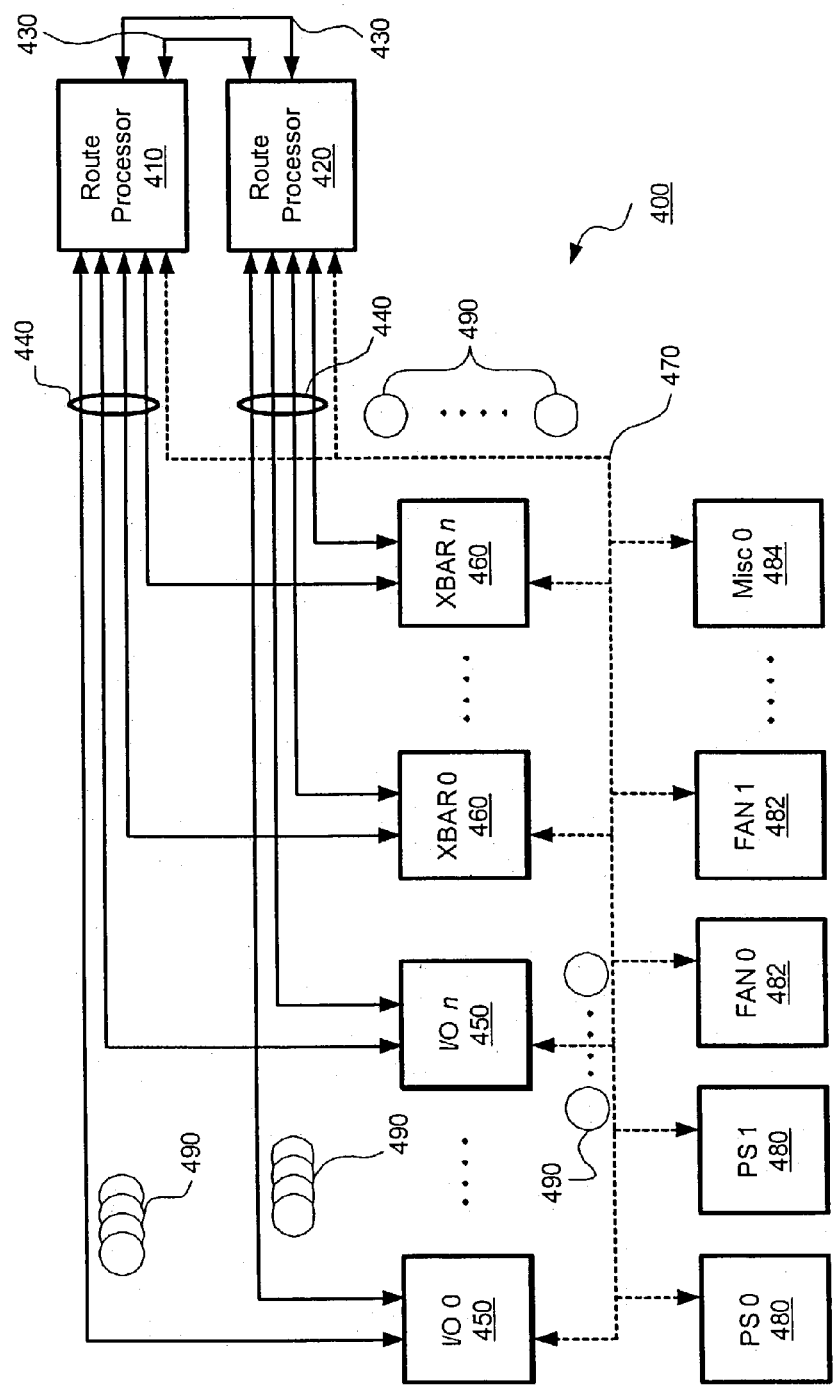
FIG. 4 is a detailed block diagram of multiple backplane dual route processor architecture according to one embodiment of the invention.

FIG. 4 illustrates an embodiment constructed using the combination of multiple control communication channels coupled with dual route processors. This system 400 includes a first route processor 410 and a second route processor 420 interconnected via a primary communication channel 430 between first and second route processors. An identical secondary communication channel 430 provides an alternative connection between the route processors. Communication channels 440 interconnect the first route processor 410 and a plurality of Input/Output (I/O) cards 450 and a plurality of crossbar (XBAR) cards 460. The communication channels 440 also provide dedicated interconnection between the secondary route processor 420 and I/O cards 450 and XBAR cards 460. A Controller Area Network (CAN) bus 470, which delegates various control functions to controllers located on or near the components or devices, interconnects all system elements. Exemplary system elements include Power Supply (PS) 480, Fan (FAN) 482, and other miscellaneous modules 484.

In one embodiment, the communication channels 430 and 440 are part of a segmented control backplane where the communication channels 430 are designated as 1000 BaseT and the communication channels 440 are 100 BaseT. However, this designation is for illustrative purposes and should not be construed as limiting the scope of the embodiment. It will be appreciated that a variety of protocols and configurations may be used to implement the teachings of the invention on packet-forwarding devices as described herein. For example, the system could also be constructed using equally matched communication channels between route processors and peripheral cards (FIG. 5) and/or different protocols could be used to create the communication channels. Exemplary protocols that could be used include Infini-Band, HyperTransport, Gigabit Ethernet, Fast Ethernet, Ethernet, Token Ring, Fiber Distributed Data Interface (FDDI), Universal Serial Bus (USB), and Arcnet.

In FIG. 4, each communication channel 430, 440 and CAN bus 470 delivers control packets 490 containing various control functions. The control packets 490 are assigned to the communication channel that may provide a desired rate of delivery corresponding to the control function. For example, the exchange of updated routing table information within the packet-forwarding device may occur at MHz and GHz frequencies and may be placed on communication channels 430 or 440, while monitoring the operational parameters of the fans within the packet-forwarding device need only occur at kHz intervals and may be easily handled by the CAN bus 470.

In one embodiment of the present invention, the slower chassis management control functions use the CAN bus 470. The delegation of chassis management and control functions to controllers on the CAN bus 470 frees the processing resources of the route processors 410 and 420 for the data path critical control functions. For example, a controller in communication with the route processors 410 and 420 via the CAN bus 470 might be instructed to monitor the operational status of the packet-forwarding device cooling system. The controller could activate the fans when the ambient temperature of the chassis rises above a threshold and deactivate the fans when the temperature falls below a second threshold. Control packets 490 from the route processors 410 and 420 could set the threshold levels for the controller.

Figure 5:
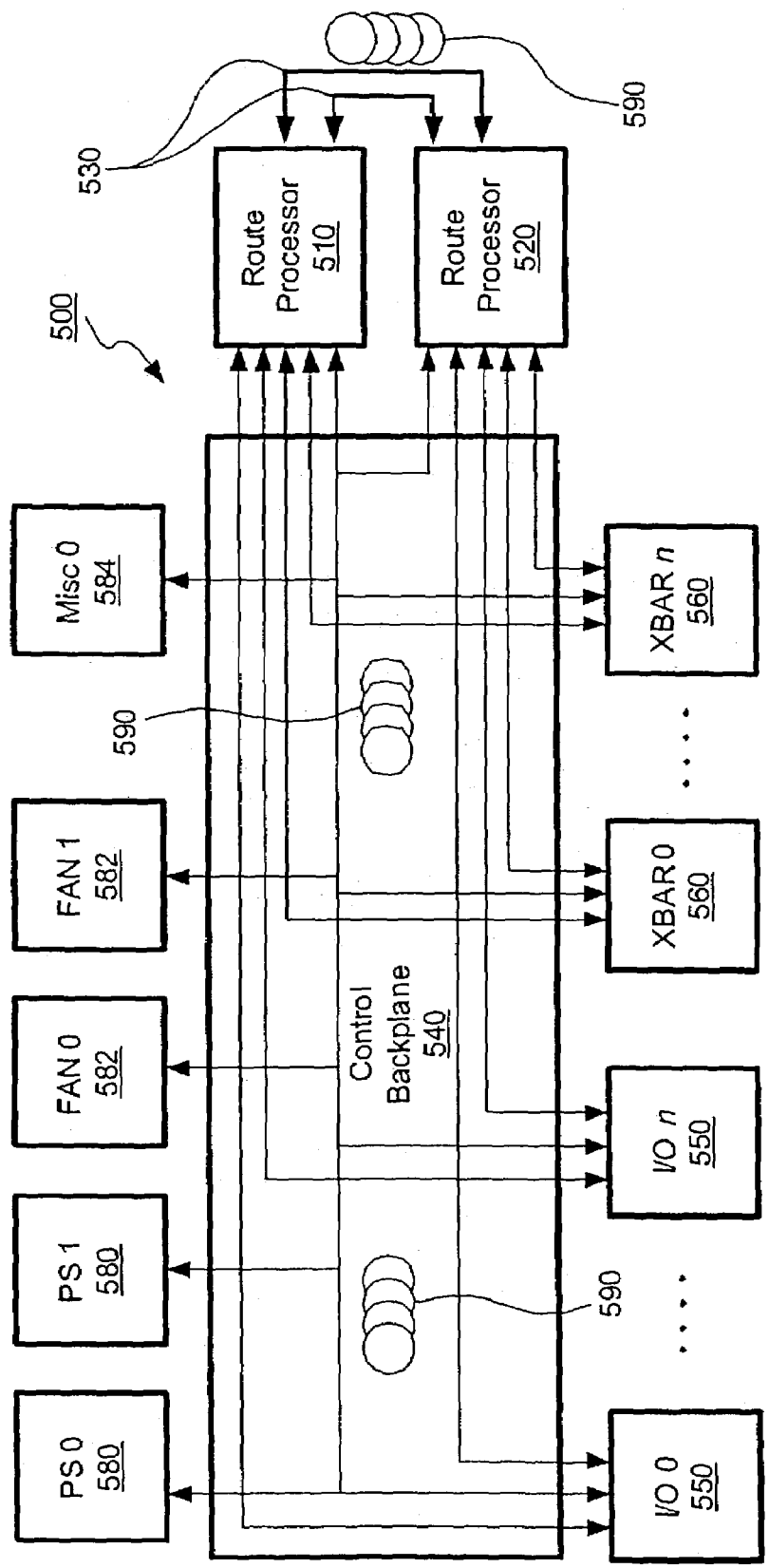
FIG. 5 is a block diagram of packet-forwarding hardware architecture according to one embodiment of the invention.

FIG. 5 is a block diagram of router hardware architecture using a dedicated control backplane system 500 according to one embodiment of the invention. This system 500 includes a first route processor 510 and a second route processor 520 interconnected via a communication channel 530. An identical secondary communication channel 530 provides an alternative direct connection between the route processors 510 and 520. Dedicated control backplane communication channels 540 interconnect all system components with the first route processor 510 and the secondary route processor 520. Exemplary system components include a plurality of Input/Output (I/O) cards 550, a plurality of crossbar (XBAR) cards 560, Power Supply (PS) units 580, Fans (FAN) 582, and other miscellaneous modules 584. Control packets 590 containing various control functions are delivered via the control backplane 540 to the system components.

Figure 6:
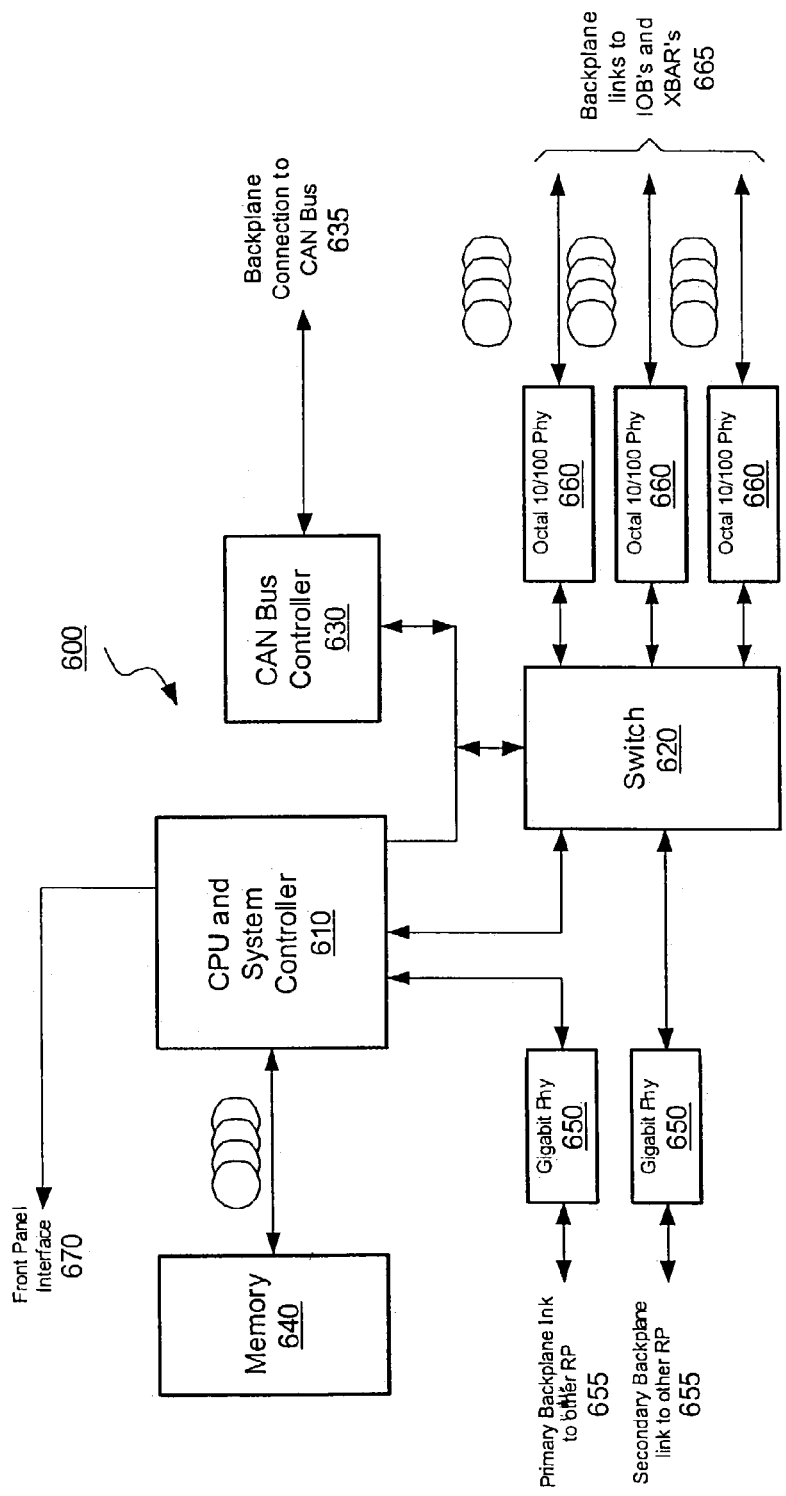
FIG. 6 is a block diagram of route processor control backplane architecture according to one embodiment of the invention.

FIG. 6 is a block diagram of a route processor system 600 using Ethernet and CAN communication channels to convey control functions to other components in a packet forwarding device (as illustrated in FIGS. 1–5). The route processor system 600 includes a processing unit (CPU) and system controller module 610, a switch 620, a CAN Bus controller 630, local system memory 640, and various Physical Layer Device (PHY) interfaces. The CAN Bus Controller 630 couples the system 600 to a CAN Bus via a CAN communication channel connection 635.

In one embodiment, the processing unit and system controller module 610 includes a dual CPU embodiment. It will be appreciated that a variety of processor and system controller embodiments may be used to implement the teachings of the invention on route processors as described herein. For example, the system could also be constructed using a single CPU, four processing units, microcontrollers, state machines, programmable logic, FPGAs, EEPROM, and the like. The system controller includes a local memory controller, such as a SDRAM controller, and a local peripheral controller. The local peripheral controller may include several interfaces, such as a generic/boot bus, a HyperTransport bus, and a PCI bus. Where the generic/boot bus interconnects components such as Boot Flash, CompactFlash, and FPGA devices to the processing unit.

The controller module 610 is connected with the switch 620 via a high-speed connection, such as Gigabit Ethernet. The switch 620 is an Ethernet switch, such as the Broadcom® BCM5615 integrated multi-layer switch which provides twenty-four 10/100 Mb Ethernet ports and two 10/100/1000 Mb Ethernet ports. The switch 620 communicates control packets from the route processor to I/O cards, crossbar switches, and provides a secondary link to other route processors in the network switch. In addition the switch 620 may provide a secondary interface to the CAN Bus controller 630. As previously discussed, the CAN Bus allows the route processor to off load many functions to CAN controllers on the devices, such as the power supplies and cooling systems. The CAN Bus controller 630 transceives control information between the CAN device controllers and the controller module 610.

In one embodiment the PHY interfaces include a Gigabit PHY 650, an Octal 10/100 PHY 660, and a front panel interface 670. The Gigabit PHY 650 links the system 600 to other route processors via high-speed backplane links 655. The Octal 10/100 PHY 660 links the system 600 with other network switch elements, such as crossbar switches and I/O boards, via the backplane links 665. In one embodiment, the backplane links 655 are Gigabit Ethernet and the backplane links 665 are 8×100BaseT. Since the system 600 is using a standard protocol, such as Ethernet, the PHY may easily be upgraded making the backplane links very scalable.

One embodiment relates to improving the delivery of control functions within a packet-forwarding device, such as a network switch. Thus, a control backplane may interconnect attached devices via dedicated Ethernet connections. The control functions may employ Ethernet packets to deliver control commands between the primary route processor and the Input/Output (I/O) cards, crossbar switches, and Ethernet switches. As such, one embodiment may distinguish the various control functions and prioritize responses accordingly. For example, the control packets containing updated routing table information might be given priority over control packets regulating the operation of fans associated with the network device's cooling system.

Another embodiment of the network device separates the data path control information from device management control information. Exemplary data path control information includes updating routing tables and generating quality of service reports. Exemplary device management control information includes detecting the insertion of a new card in a slot, monitoring both the temperature of the chassis and/or the operational status of the cooling fans, and monitoring the power supply to the router. The separation of the control information onto separate delivery networks increases the performance while reducing the operational overhead of the routing processor.

Another embodiment separates control functions into separate communication channels, such as a Gigabit Ethernet, Fast Ethernet, Ethernet, and CAN Bus. This separation reduces overhead associated with management and operational control functions and increases the bandwidth available for transmitting data plane control functions.

The device management and operational control information tend to be less time sensitive so that many of the device management control functions can be performed locally by micro-controllers without substantial route processor intervention. In one embodiment of the present invention, the device management control information uses a Controller Area Network (CAN), which delegates various control functions to controllers on the components or devices. The CAN controllers free the processing resources of the route processor for the data path critical control functions. For example, a CAN controller could monitor the operational status of the network device cooling system, activating the fans when the ambient temperature of the chassis rises above a threshold and deactivating the fans when the temperature falls below a second threshold.

One embodiment of the present invention interconnects the route-processing units with other network switch components via dedicated Ethernet connections. An Ethernet switch provides a scalable interface to transmit control data, such as packet transfers or updated routing tables, between the primary route processor and the Input/Output (I/O) cards, crossbar switches, and neighboring route processors. In this way, the efficiency and usage of communication channels within the network switch dramatically increases.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   segregating control information from data information;
   distinguishing a first control function from a second control function in the segregated control information;
   prioritizing the control information based on a relative priority of the first and second control functions; and
   delivering control information via a control backplane in accordance with the relative priority of the control functions in the control information; and
   delivering data information via a data backplane.

2. The method of claim 1, further comprising segregating control information into data path control information and device management control information.

3. The method of claim 2, wherein the data path control information is delivered concurrently to components within a packet-forwarding device.

4. The method of claim 2, wherein delivering control information further comprises delivering the data path control information via a first control communication channel and delivering the device management control information via a second control communication channel.

5. The method of claim 4, wherein the first control communication channel is Ethernet.

6. The method of claim 4, wherein the second control communication channel is a Controller Area Network (CAN).

7. The method of claim 1, further comprising segregating control information into high-frequency control information and low-frequency control information.

8. The method of claim 1, wherein the control information is concurrently delivered via a dedicated control backplane.

9. The method of claim 1, wherein the control information is packetized.

10. The method of claim 1, wherein delivering control information via the control backplane further comprises delivering control information via a plurality of dedicated Ethernet communication channels.

11. An article of manufacture comprising:
    a computer-accessible medium including data that, when accessed by a computer cause the computer to,
    segregate control information from data information;
    distinguish a first control function from a second control function in the segregated control information;
    prioritize the control information based on a relative priority of the first and second control functions; and
    deliver control information via a control backplane in accordance with the relative priority of the control functions in the control information; and
    deliver data information via a data backplane.

12. The article of manufacture of claim 11, wherein the computer-accessible medium including data further cause the computer to segregate control information into data path control information and device management control information.

13. The article of manufacture of claim 12, wherein the data that causes the computer to deliver control information delivers the data path control information via a first control backplane and delivers the device management control information via a second control backplane.

14. The article of manufacture of claim 13, wherein the first control backplane is Ethernet.

15. The article of manufacture of claim 13, wherein the second control backplane is a Controller Area Network (CAN).

16. The article of manufacture of claim 13, wherein the data path control information is delivered concurrently to components within the computer.

* * * * *